(12) United States Patent
Hayashi et al.

(10) Patent No.: US 8,381,863 B2
(45) Date of Patent: Feb. 26, 2013

(54) CONNECTION STRUCTURE ARRANGEMENT BETWEEN A FRAME MEMBER AND AN ENGINE OF A SADDLE-TYPE VEHICLE, AND VEHICLE INCORPORATING SAME

(75) Inventors: Kanji Hayashi, Saitama (JP); Masao Akieda, Saitama (JP); Katsumasa Mukai, Saitama (JP); Yutaka Nakanishi, Saitama (JP); Jun Hariu, Saitama (JP); Kenji Morita, Saitama (JP); Osamu Kikuchi, Saitama (JP); Takeshi Kimishima, Saitama (JP); Kazuma Morimitsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/718,686

(22) Filed: Mar. 5, 2010

(65) Prior Publication Data
US 2010/0243364 A1 Sep. 30, 2010

(30) Foreign Application Priority Data
Mar. 31, 2009 (JP) ................................. 2009-087781

(51) Int. Cl.
*B60K 1/00* (2006.01)
(52) U.S. Cl. ........................................ 180/291; 180/219
(58) Field of Classification Search .................. 180/291, 180/225, 219, 228, 230; 123/195 R, 559.1, 123/41.31, 90.31, 41.47
See application file for complete search history.

(56) References Cited

U.S. PATENT DOCUMENTS

| | | | | |
|---|---|---|---|---|
| 4,412,597 A * | 11/1983 | Aiba | | 180/228 |
| 6,315,072 B1 * | 11/2001 | Brown et al. | | 180/228 |
| 6,966,290 B2 * | 11/2005 | Utsumi et al. | | 123/90.31 |
| 7,114,926 B2 * | 10/2006 | Oshita et al. | | 123/41.47 |
| 7,240,755 B2 * | 7/2007 | Iwata et al. | | 180/219 |
| 7,469,689 B1 * | 12/2008 | Jones et al. | | 123/559.1 |
| 7,849,947 B2 * | 12/2010 | Morita | | 180/219 |
| 2004/0247444 A1 * | 12/2004 | Oshita et al. | | 416/244 R |
| 2009/0008177 A1 * | 1/2009 | Sheahan et al. | | 180/225 |

FOREIGN PATENT DOCUMENTS

JP 2005-014885 1/2005

* cited by examiner

*Primary Examiner* — Hau Phan
(74) *Attorney, Agent, or Firm* — Carrier Blackman & Associates, P.C.; Joseph P. Carrier; William D. Blackman

(57) ABSTRACT

A saddle-type vehicle has an engine-fastening structure which stabilizes a seating face contact between a collar and a vehicle body frame on one side, and between the collar and an engine on the other side. The vehicle includes a vehicle body frame having an engine-supporting portion, and an engine block having a female threaded portion formed therein for alignment with the engine-supporting portion. The collar is interposed between the engine-supporting portion and the engine block. The engine-supporting portion of the frame, the collar and the engine side female threaded portion are fastened together by a bolt. A gap is provided at least at locations between the collar and the bolt which oppose a boundary between the collar and the engine-supporting portion, and another boundary between the collar and the engine side female threaded portion.

18 Claims, 13 Drawing Sheets

(a)

(b)

(c)

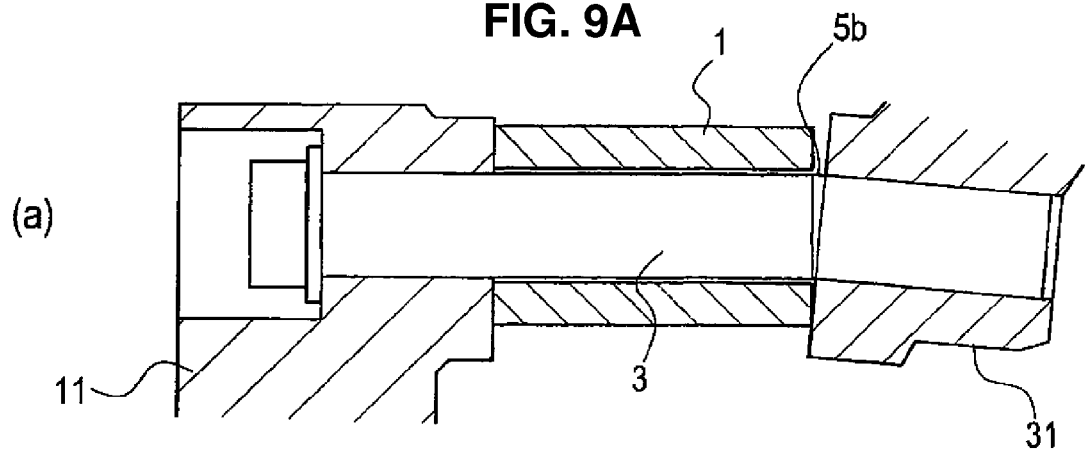
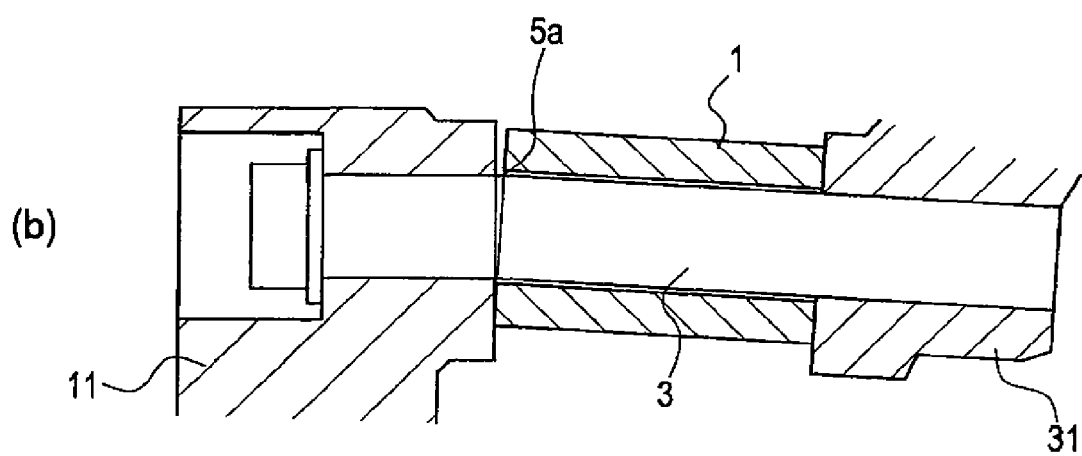

CONNECTION STRUCTURE ARRANGEMENT BETWEEN A FRAME MEMBER AND AN ENGINE OF A SADDLE-TYPE VEHICLE, AND VEHICLE INCORPORATING SAME

CROSS-REFERENCE TO RELATED APPLICATIONS

The present invention claims priority under 35 USC 119 based on Japanese patent application No. 2009-087781, filed on Mar. 31, 2009. The entire subject matter of this priority document, including specification, claims and drawings, is incorporated by reference herein.

BACKGROUND OF THE INVENTION

1. Field of the Invention

The present invention relates to a connection arrangement between a frame member and an engine of a saddle-type vehicle, and to a vehicle incorporating the same. More particularly, the present invention relates to an engine-fastening structure of a saddle-type vehicle, and a vehicle incorporating the same.

2. Description of the Background Art

In a motorcycle, which is one example of a saddle-type vehicle, normally the engine is a component having the highest weight. It is known that fastening of the engine and a frame to each other is a significant factor in setting for vibrations and traveling behaviors, as discussed in the Japanese Patent Laid-Open No. 2005-014885.

For example, it is well known that vibrations or the rigidity of a finished vehicle varies depending upon whether rigid mounting or rubber mounting is used for an engine. In a motorcycle wherein an engine is mounted on a frame by rigid mounting, the engine and the frame are fastened to each other with a collar interposed therebetween. The collar can make relative displacement to the bolt by a very small distance in a diametrical direction because a clearance of approximately 0.3 mm exists between the collar and the fastening bolt.

The relative displacement between the collar and the bolt is suppressed by friction between a frame side seating face and an engine side seating face upon which axial force of fastening acts. In a motorcycle which adopts the rigid mounting, the contact state of the components mentioned is maintained with certainty to achieve stabilization of vehicle body vibration and the control performance.

If a motorcycle wherein an engine having high weight is rigidly mounted through a collar travels on a road having a large gap, then the vehicle undergoes upward and downward vibrations, and a load higher than holding force of the contact seating faces at the opposite ends of the collar may be generated at the fastening portions and the fastening bolt may undergo shearing deformation and may be plastically deformed by a very small amount.

If the fastening bolt is plastically deformed, then variation of the contacting portions of the frame, collar and engine and variation in contact pressure distribution of the seating faces occur. This sometimes results in failure in stabilized seating face contact and in variation of vibrations or the drivability.

In such an instance, the structure of the fastening portion between the frame and the engine is set appropriately in accordance with the vehicle. In the prior art document, a structure is disclosed wherein, in an engine supporting structure for a motorcycle where a collar is interposed between a frame and an engine, wedge-like projections are provided on opposite end seating faces of the collar.

With a structure such as described above, it is possible to effectively suppress the relative displacement between the collar and the bolt.

However, according to the conventional structure, the cost required for working of the collar is high. Further, positioning in a circumferential direction of the collar is required, and time and labor are required for assembling these components.

The present invention has been made in view of the situation described above. Accordingly, it is one of the objects of the present invention to provide a saddle-type vehicle having an engine-fastening structure which stabilizes seating face contact between a frame and a collar, and between an engine and the collar and is low in cost and easy in fastening working.

SUMMARY OF THE INVENTION

In order to achieve the above objects, the present invention according to a first aspect thereof provides a saddle-type vehicle. The saddle-type vehicle includes an engine-supporting portion provided on a vehicle body frame, and an engine side female threaded portion, and a collar interposed between the engine-supporting portion and the engine side female threaded portion. The engine-supporting portion, collar and engine side female threaded portion are fastened by a bolt.

The present invention according to the first aspect thereof is characterized in that at least at locations between the collar and the bolt which oppose to a boundary between the collar and the engine-supporting portion and another boundary between the collar and the engine side female threaded portion, a gap in a diametrical direction greater than that at any other location is provided.

In the saddle-type vehicle, in the structure wherein the engine is fastened to the vehicle body frame with the collar interposed therebetween by the bolt, concentration of shearing stress acting upon the bolt along a cross section which includes an end face of the collar is dispersed over a range in which the gap is formed. Consequently, the concentration is moderated.

The present invention according to a second aspect thereof, in addition to the first aspect, is characterized in that at least one of an engine side end portion and a frame side end portion of a fitting hole of the collar is formed as a large-diameter portion having a great inner diameter, and any other portion of the fitting hole of the collar is formed as a small diameter portion having a smaller diameter than that of the large-diameter portion.

In the saddle-type vehicle, positioning is carried out at the end face of the small diameter portion having a large contact area, while concentration of the shearing stress is moderated on the end face side of the large diameter portion which has a small contact area.

The present invention according to a third aspect thereof, in addition to the second aspect, is characterized in that the collar large-diameter portion has a width equal to or greater than 5 mm, and a diameter difference between the large-diameter portion and the bolt is equal to or greater than 1 mm.

In the saddle-type vehicle, particularly with a large-sized engine having high weight, concentration of the shearing stress which appears where the width of the large diameter is 5 mm or more and the diameter difference is 1 mm or less can be prevented.

The present invention according a fourth aspect thereof, in addition to the third aspect, is characterized in that a mark portion is provided on a cylindrical face of the large-diameter portion side of the collar.

In the saddle-type vehicle, discrimination between the large diameter side and the small diameter side of the collar is facilitated.

The present invention according to a fifth aspect thereof, in addition to the first aspect, is characterized in that one of a portion of the bolt in a range from the engine side end portion of the collar to the engine side female threaded portion, another portion of the bolt in another range from the engine-supporting portion to the frame side end portion of the collar and a portion of the bolt in a further range of an intermediate portion of the collar is formed as a large-diameter portion.

The present invention according the fifth aspect thereof is further characterized in that where the portion of the bolt in the range from the engine side end portion of the collar to the engine side female threaded portion is formed as the large-diameter portion, also an end portion of the bolt in a range of a portion of the engine-supporting portion which is outside of the frame is formed as the large-diameter portion, and that where the portion of the bolt in the range from the engine-supporting portion to the frame side end portion of the collar is formed as the large-diameter portion, also an end portion of the bolt which is on the inner side of the engine side female threaded portion is formed as the large-diameter portion.

The present invention according to the fifth aspect thereof is furthermore characterized in that where the portion of the bolt in the range of the intermediate portion of the collar is formed as the large-diameter portion, also a portion of the bolt in a range of an end portion of the engine-supporting portion which is outside of the frame and a portion of the bolt in another range of an inner side end portion of the engine side female threaded portion are formed as the large-diameter portions, and that any other portion of the bolt is formed as a small diameter portion having a diameter smaller than the diameter of the large diameter portion or portions.

In the saddle-type vehicle, positioning is carried out by the large diameter portion of the bolt and the collar, and concentration of the shearing stress is moderated between the small diameter portion of the bolt and the collar.

The present invention according to a sixth aspect thereof, in addition to the fifth aspect, is characterized in that the small diameter portion of the bolt has a width of 5 mm or more in the range of the collar from an end portion of the collar, and an inner diameter difference between the small diameter portion of the bolt and the fitting hole of the collar is 1 mm or more.

In the saddle-type vehicle, particularly in an engine-fastening structure for a saddle-type vehicle of a large cylinder capacity, an optimum shape which suppresses shearing deformation of the bolt can be achieved.

The present invention according to a seventh aspect thereof provides a saddle-type vehicle. The saddle-type vehicle includes a pair of left and right engine-supporting portions provided on a vehicle body frame, an engine having a through-hole provided therein, a collar interposed between the engine-supporting portion and the through-hole of the engine, and a penetrating bolt having a male threaded portion formed at an end portion thereof and extending through the pair of left and right engine-supporting portions, the collar and the through-hole of the engine and a nut for being screwed with the male threaded end portion of the penetrating bolt to fasten the pair of left and right engine-supporting portions, collar and engine.

The present invention according to the seventh aspect is characterized in that at least at locations between the collar and the bolt which oppose to a boundary between the collar and the engine-supporting portion and another boundary between the collar and the through-hole, a gap in a diametrical direction greater than that at any other location is provided.

In the saddle-type vehicle, in the structure wherein the engine is fastened to the pair of left and right engine-supporting portions with the collar interposed therebetween by the through bolt, concentration of shearing stress acting upon the through bolt along a cross section which includes an end face of the collar is dispersed over a range in which the gap is formed. Consequently, the concentration is moderated.

The present invention according to an eighth aspect thereof, in addition to the seventh aspect, is characterized in that at least one of an engine side end portion and a frame side end portion of a fitting hole of the collar is formed as a large-diameter portion having a great inner diameter, and any other portion of the fitting hole of the collar is formed as a small diameter portion having a smaller diameter than that of the large-diameter portion.

In the saddle-type vehicle, positioning is carried out at the end face of the small diameter portion having a large contact area while concentration of the shearing stress is moderated on the end face side of the large diameter portion which has a small contact area.

The present invention according to a ninth aspect thereof, in addition to the eighth aspect, is characterized in that the collar large-diameter portion has a width equal to or greater than 5 mm, and a diameter difference between the large-diameter portion and the bolt is equal to or greater than 1 mm.

In the saddle-type vehicle, particularly with a large-sized engine having high weight, concentration of the shearing stress which appears where the width of the large diameter is 5 mm or less and the diameter difference is 1 mm or less can be prevented.

The present invention according to a tenth aspect thereof, in addition to the ninth aspect, is characterized in that a mark portion is provided on a cylindrical face of the large-diameter portion side of the collar.

In the saddle-type vehicle, discrimination between the large diameter side and the small diameter side of the collar is facilitated.

The present invention according to an eleventh aspect thereof, in addition to the seventh aspect, is characterized in that one of a portion of the bolt in a range from the engine side end portion of the collar to the through-hole, another portion of the bolt in another range from the engine-supporting portion to the frame side end portion of the collar and a portion of the bolt in a further range of an intermediate portion of the collar is formed as a large-diameter portion.

The present invention according to the eleventh aspect thereof is further characterized in that where the portion of the bolt in the range from the engine side end portion of the collar to the through-hole is formed as the large-diameter portion, also an end portion of the bolt in a range of a portion of the engine-supporting portion which is outside of the frame is formed as the large-diameter portion The present invention according to the eleventh aspect is furthermore characterized in that where the portion of the bolt in the range from the engine-supporting portion to the frame side end portion of the collar is formed as the large-diameter portion, also an end portion of the bolt which is on the inner side of the engine side female threaded portion is formed as the large-diameter portion, that where the portion of the bolt in the range of the intermediate portion of the collar is formed as the large-diameter portion, also a portion of the bolt in a range of an end portion of the engine-supporting portion which is outside of the frame and a portion of the bolt in another range of an inner side end portion of the engine side female threaded portion, and that any other portion of the bolt is formed as a small diameter portion having a diameter smaller than the diameter of the large diameter portion or portions.

In the saddle-type vehicle, positioning is carried out by the large diameter portion of the bolt and the collar, and concentration of the shearing stress is moderated between the small diameter portion of the bolt and the collar.

The present invention according a twelfth aspect thereof, in addition to the eleventh aspect, is characterized in that the small diameter portion of the bolt has a width of 5 mm or more in the range of the collar from an end portion of the collar, and an inner diameter difference between the small diameter portion of the bolt and the fitting hole of the collar is 1 mm or more.

In the saddle-type vehicle, particularly in an engine-fastening structure for a saddle-type vehicle of a large cylinder capacity, an optimum shape which suppresses shearing deformation of the bolt can be achieved.

In the saddle-type vehicles according to the first and seventh aspects, where the vehicle body frame, collar and engine tend to make relative displacement, positioning of the collar and the bolt is carried out at the contact location therebetween, and the side on which relative displacement between the collar and the vehicle body frame or between the collar and the engine occurs can be controlled. Consequently, shearing deformation of the bolt can be suppressed to the utmost. As a result, plastic deformation of the bolt becomes less likely to occur, and the seating face contact at the opposite ends of the collar can be stabilized.

In the saddle-type vehicles according to the second and eighth aspects, since the fitting hole of the collar has a step formed thereon, where the vehicle body frame, collar and engine tend to make relative displacement, positioning is carried out by the small diameter portion and the bolt. Further, since the area of the end face on the large diameter portion side is small, relative displacement occurs on the seating face on the large diameter portion side.

In other words, the side on which relative displacement occurs between the collar and the vehicle body frame or between the collar and the engine can be controlled. Since the bolt on the large diameter portion side is less likely to contact with the collar, shearing deformation of the bolt can be suppressed to the utmost. As a result, plastic deformation becomes less likely to occur with the bolt, and the seating face contact at the opposite ends of the collar can be stabilized.

In the saddle-type vehicles according to the third and ninth aspects, particularly in an engine-fastening structure for a saddle-type vehicle of a large cylinder capacity, an optimum shape which suppresses shearing deformation of the bolt can be achieved.

In the saddle-type vehicles according to the fourth and tenth aspects, the large diameter portion side of the collar is visually observed, and working upon fastening is facilitated.

In the saddle-type vehicles according to the fifth and eleventh aspects, since the bolt has a step formed thereon, where the frame, collar and engine tend to make relative displacement, since positioning is carried out by the large diameter portion and the collar, relative displacement occurs on the seating face on the small diameter portion side.

Accordingly, the side on which relative displacement occurs between the collar and the frame or between the collar and the engine can be controlled. Besides, since the bolt on the small diameter portion side is less likely to contact with the collar, shearing deformation of the bolt can be suppressed to the utmost. As a result, shearing deformation becomes less likely to occur with the bolt, and the seating face contact at the opposite ends of the collar can be stabilized.

In the saddle-type vehicles according to the sixth and twelfth aspects, particularly in an engine-fastening structure for a saddle-type vehicle of a large cylinder capacity, an optimum shape which suppresses shearing deformation of the bolt can be achieved.

BRIEF DESCRIPTION OF THE DRAWINGS

FIG. 9A is conceptive view illustrating a plastic deformation situation of the supporting structure shown in FIG. 8A.

FIG. 9B is conceptive view illustrating a plastic deformation situation of the supporting structure shown in FIG. 8B.

DETAILED DESCRIPTION OF ILLUSTRATIVE EMBODIMENTS

Figure 1:
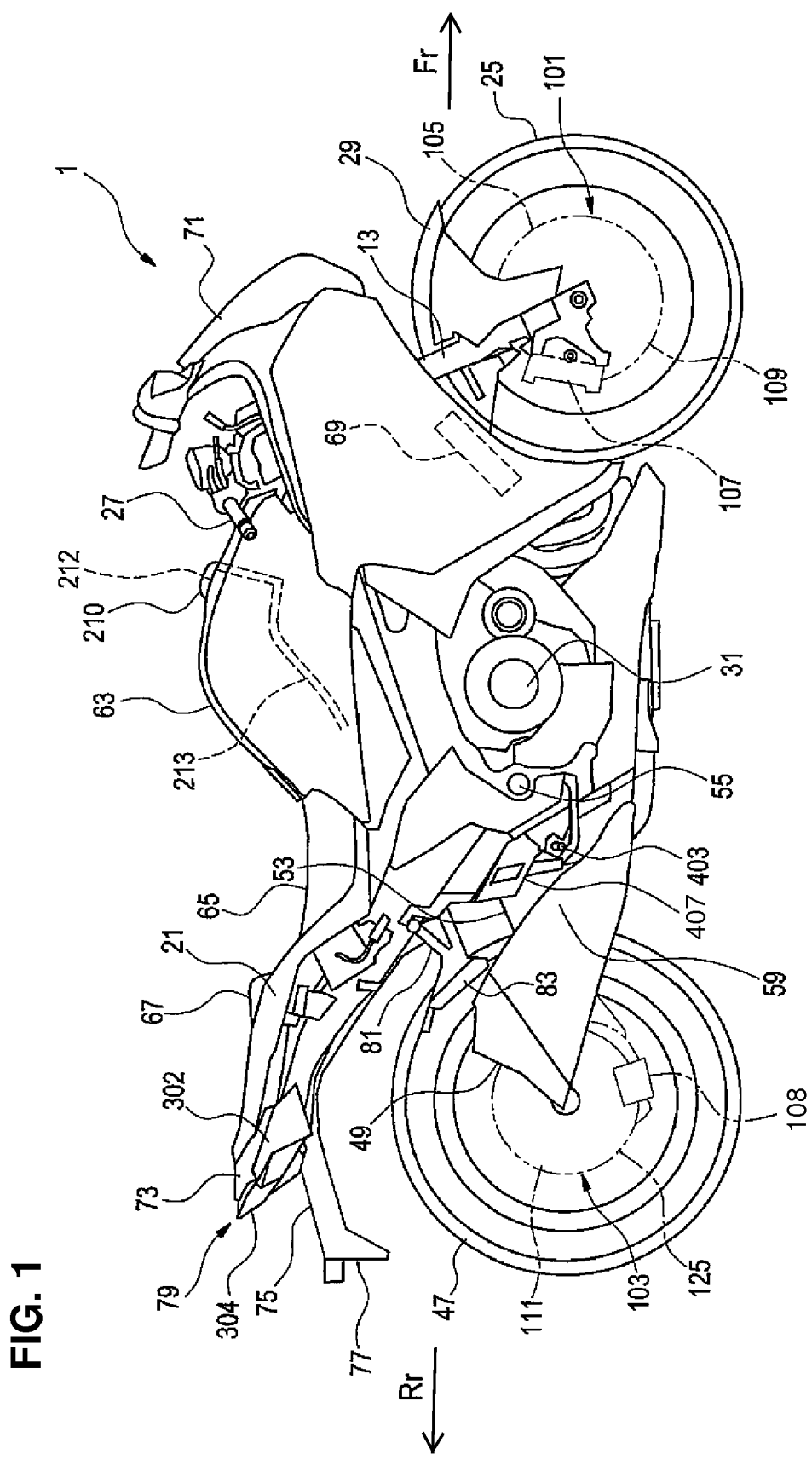
FIG. 1 is a side elevational view showing a basic configuration of a motorcycle according to an illustrative embodiment of the present invention.

In the following, an embodiment of a saddle-type vehicle according to the present invention is described in detail with reference to the drawings. It is to be noted that each drawing should be viewed in the direction of reference characters, and in the following description, the forward and backward, leftward and rightward, and upward and downward directions are directions representing directions as viewed by a driver sitting on the seat and facing forwardly. In the drawings, the forward direction is represented by Fr, the rearward direction by Rr, the leftward direction by L, the rightward direction by R, the upward direction by U and the downward direction by D.

Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

The present invention is suitably applied, for example, to a motorcycle or all-terrain vehicle, which is a saddle-type vehicle.

Figure 2:
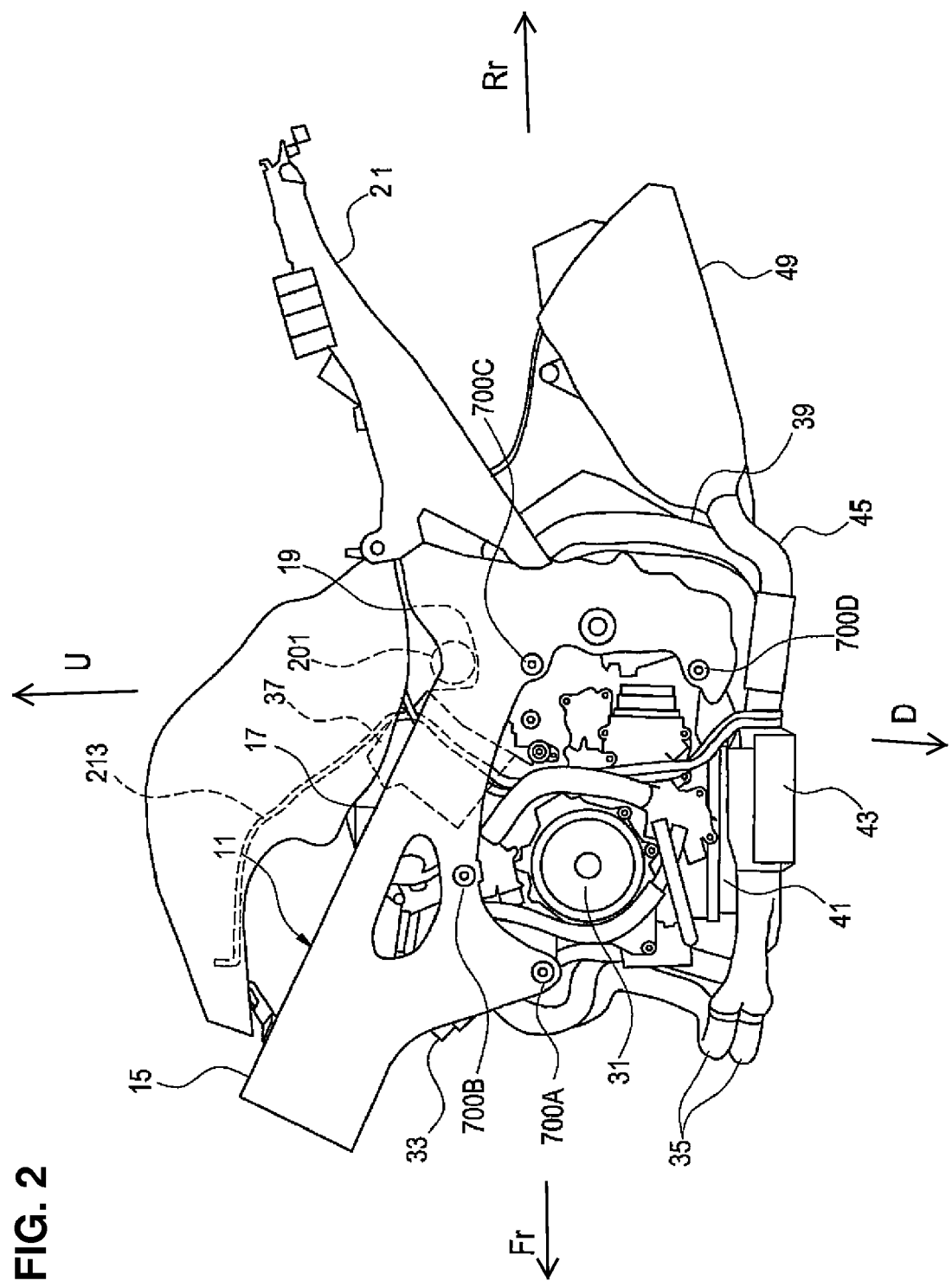
FIG. 2 is a side elevational view showing a portion of the left side of a vehicle body.

FIG. 1 is a side elevational view showing a basic configuration of a motorcycle 1 according to the illustrative embodiment, and FIG. 2 is a side elevational view of the left side of a vehicle body.

The motorcycle 1 includes a vehicle body frame 11. The vehicle body frame 11 includes a head pipe 15 for supporting a front fork 13 for steering operation, a pair of left and right main frames 17 extending rearwardly downwardly from the head pipe 15, a pair of left and right intermediate frames 19 connecting to rear ends of the main frames 17 and extending upwardly and downwardly, and a pair of left and right seat rails 21 extending rearwardly upwardly from upper portions of the intermediate frames 19.

A front wheel 25 is supported for rotation at a lower end of the front fork 13, and a handle bar 27 is connected to an upper end of the front fork 13. A front fender 29 which covers over the front wheel 25 is supported on the front fork 13.

Disk brakes 101 and 103 shown in FIG. 1 are attached to the front wheel 25 and a rear wheel 47, respectively. For example, the disk brake 101 for the front wheel 25 has a brake disk 105 secured to the front wheel 25 for integrally rotating with the front wheel 25, and a caliper 107 attached to the front fork 13. The rear disk brake 103 includes a caliper 108. The caliper 107 has a pair of built-in friction pads movable in directions toward and away from each other by pistons (not shown) by a hydraulic pressure generated from a master cylinder (not shown). The friction pads sandwich braking faces 109 and 125 of the opposite side faces of the brake disks 105 and 111 to apply braking force to the front wheel 25 and the rear wheel 47, respectively.

A V-type water-cooled 4-cylinder engine 31 includes an engine block 34 which is carried on the main frames 17 and the intermediate frames 19 such that, as shown in FIG. 2, the engine 31 is supported by a first supporting portion 700A, a second supporting portion 700B, a third supporting portion 700C and a fourth supporting portion 700D. A front side cylinder exhaust pipe 35 extends forwardly from a front side cylinder 33 of the engine 31, and a rear side cylinder exhaust pipe 39 extends rearwardly once from a rear side cylinder 37 and then extends forwardly and further extends rearwardly again. The front side cylinder exhaust pipe 35 and the rear side cylinder exhaust pipe 39 extend downwardly along the front face of a crankcase 41 of the engine 31 and are positioned below the crankcase 41 with a catalyst chamber (CAT chamber) 43 interposed therebetween.

The catalyst chamber 43 connects to a rear collecting pipe 45 through a collecting pipe hereinafter described. The rear collecting pipe 45 is disposed in a space formed between a lower portion of the crankcase 41 and the rear wheel 47 and connects to a muffler 49 which extends to the vehicle body right side of the rear wheel 47. The rear collecting pipe 45 is supported below the crankcase 41.

The muffler 49 is disposed in a crossing relationship with a swing arm 53, which supports the rear wheel 47 at a rear end portion thereof, as viewed in side elevational view. The swing arm 53 is supported at a front end portion thereof for rocking motion in upward and downward directions at a lower portion of the muffler 49 and is suspended by a rear cushion 57 provided between the swing arm 53 and an upper end portion of the pivot plate 51. A step holder 407 including a rider's step 403 is provided between the front wheel 25 and the rear wheel 47.

Output power of the engine 31 is transmitted to the rear wheel 47 through a drive shaft 59. The drive shaft 59 is built in the swing arm 53 disposed on the left side of the engine 31 in a state wherein it is directed in a forward direction Fr of the advancing direction of the motorcycle.

A fuel tank 63 supported by the main frames 17 is disposed above the engine 31, and a rider's seat (main seat) 65 for allowing a rider to be seated thereon is disposed rearwardly of the fuel tank 63 such that it is supported by the seat rails 21. A pillion seat 67 as a passenger's seat for being seated by a passenger is disposed rearwardly of the rider's seat 65.

A canister 201 is provided downwardly of a rear portion of the fuel tank 63, and the canister 201 catches volatile fuel gas in the fuel tank 63 without allowing the same to leak to the outside. In FIG. 1, reference numeral 210 denotes a lid, 212 a fuel filler, and 213 a purge pipe.

A radiator 69 is disposed in front of the engine 31. The vehicle body frame 11 forwardly of the head pipe 15 is covered with a front cowl 71 made of synthetic resin. Further, a front portion of the main frames 17 and front portions and lower portions of the radiator 69 and the engine 31 are covered from the opposite sides thereof with a lower side cowl (not shown) made of synthetic resin and connecting to the front cowl 71.

A rear cowl 73 for covering a rear portion of the vehicle body frame 11 and a rear fender 75 for covering the rear wheel 47 disposed below the rear cowl 73 from above are attached to a rear portion of the vehicle body frame 11. Further, a pair of left and right plate attaching portions 77 for attaching a license plate (not shown) is provided on the rear fender 75.

In the rear cowl 73, a rear combination lamp 79 wherein a pair of left and right winkers 302 and a tail and stop lamp 304 between the left and right winkers 302 are integrated with each other is disposed such that a rear portion of the rear combination lamp 79 faces rearwardly from a rear end of the rear cowl 73. As shown in FIG. 1, the motorcycle includes a pillion step holder 81 provided on the left and right of the vehicle body, and 83 a pillion step.

In the motorcycle 1, an engine-supporting portion is provided on the vehicle body frame 11, and a bolt is inserted in the engine-supporting portion and a nut is tightened to the bolt to support the engine 31 on the engine-supporting portion. When the engine 31 is attached to the engine-supporting portion, a gap may be provided between the engine-supporting portion and the engine 31, and in order to fill up the gap, a collar is interposed between the engine-supporting portion and the engine 31.

As shown in FIG. 2, the engine 31 is supported on the vehicle body frame 11 by the first supporting portion 700A, second supporting portion 700B, third supporting portion 700C and fourth supporting portion 700D.

Figure 3:
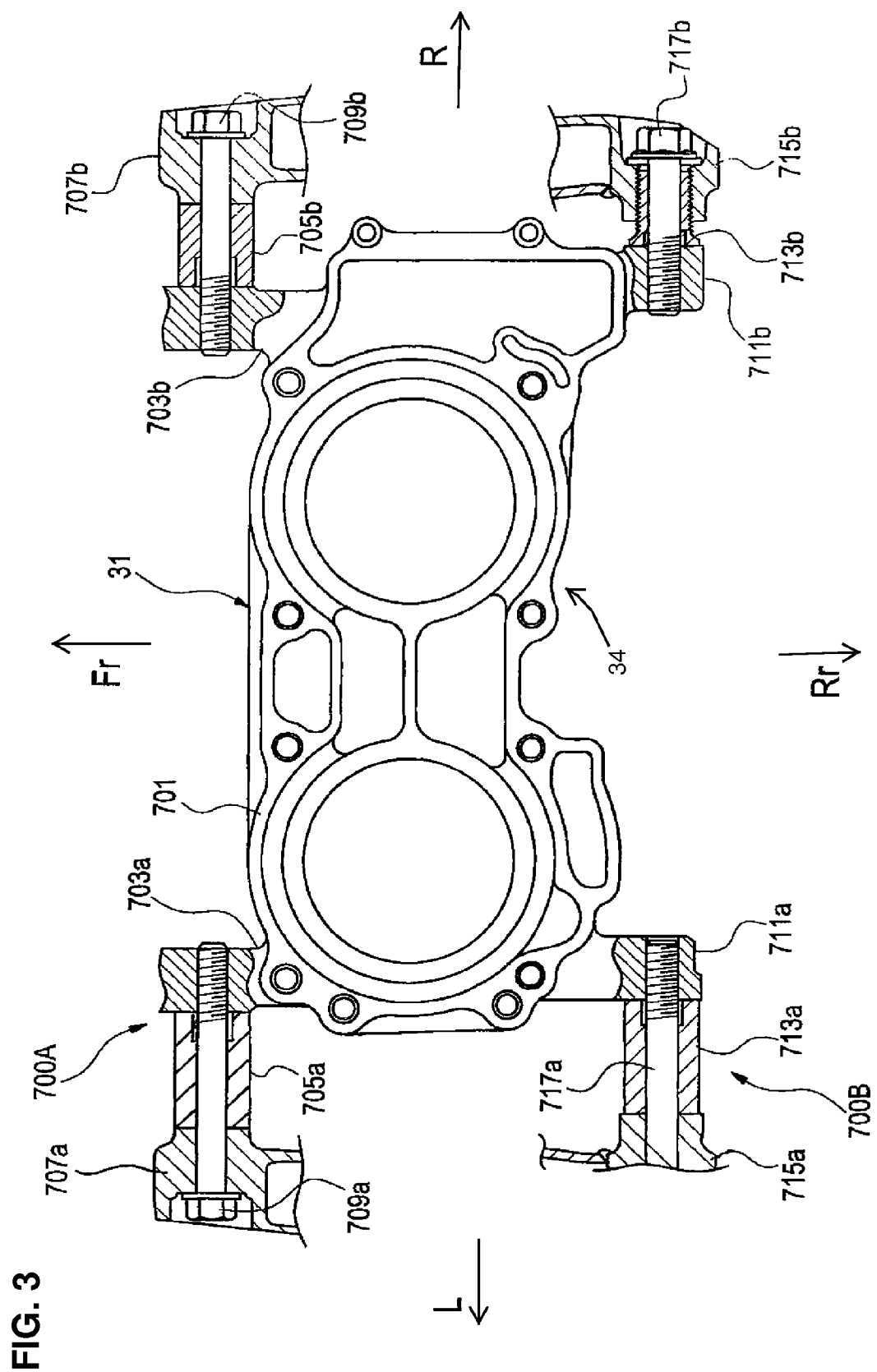
FIG. 3 is a sectional view including a first supporting portion and a second supporting portion of an engine.
Figure 4:
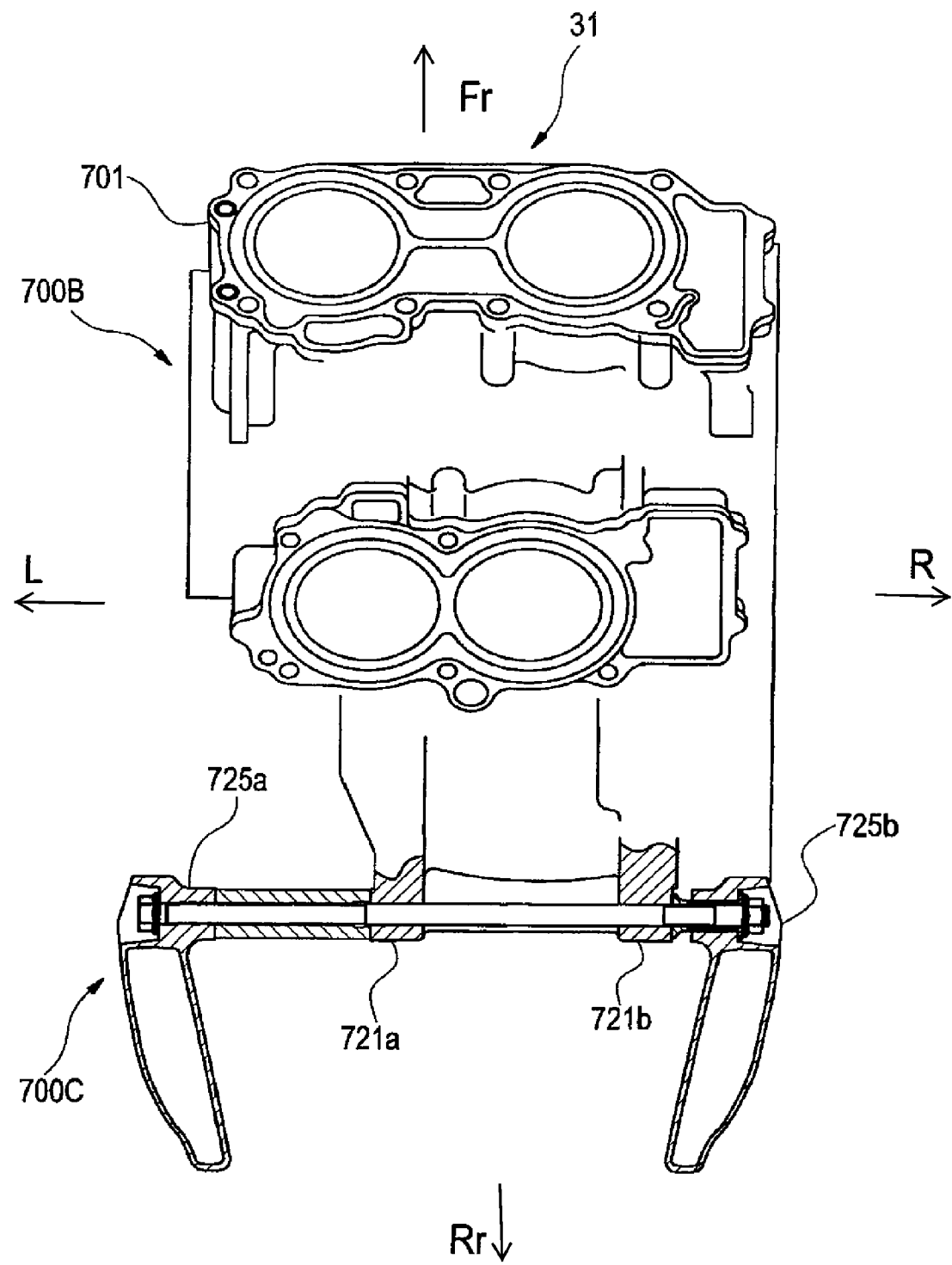
FIG. 4 is a sectional view showing a third supporting portion of the engine.
Figure 5:
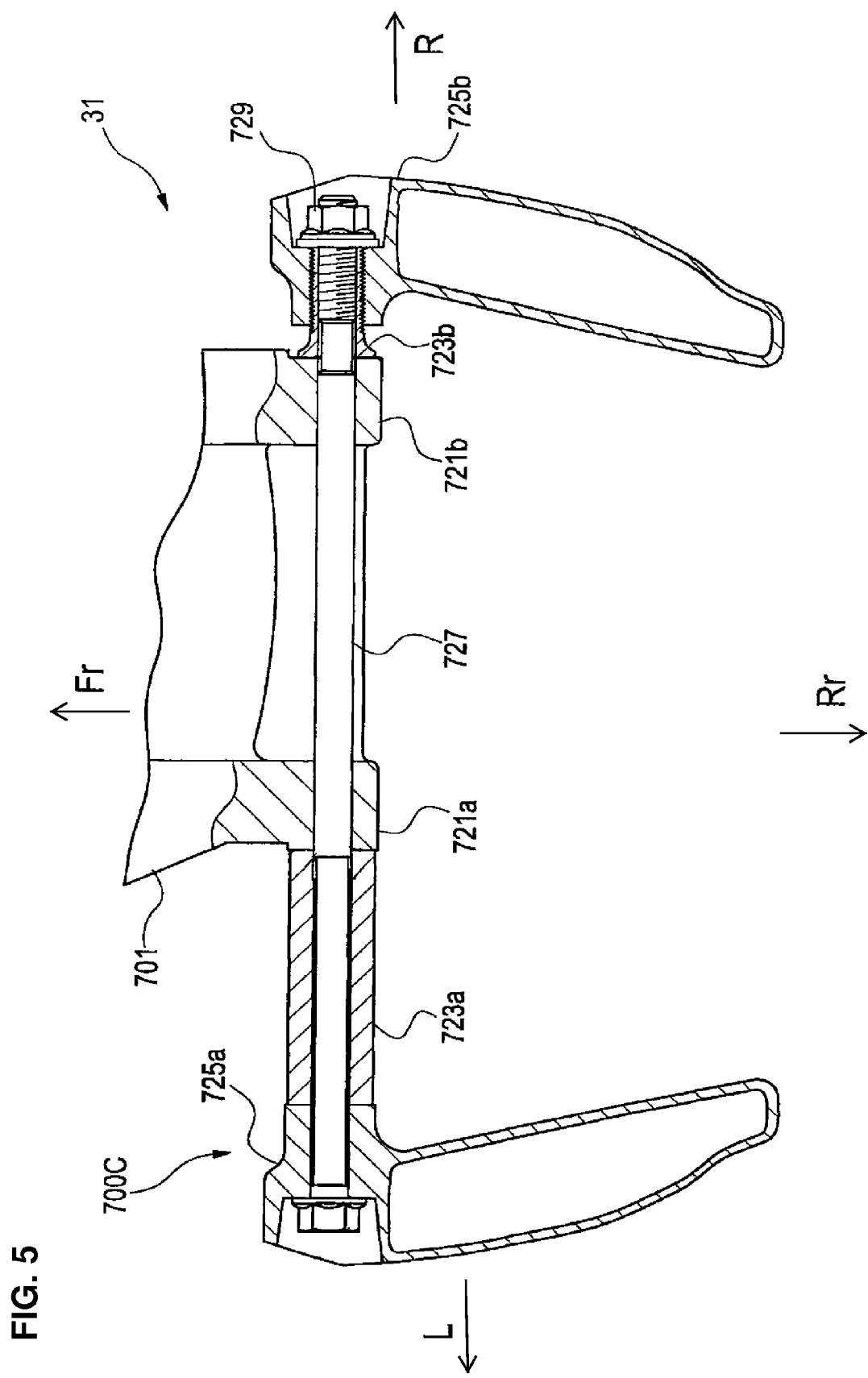
FIG. 5 is an enlarged view of a portion of FIG. 4.
Figure 6:
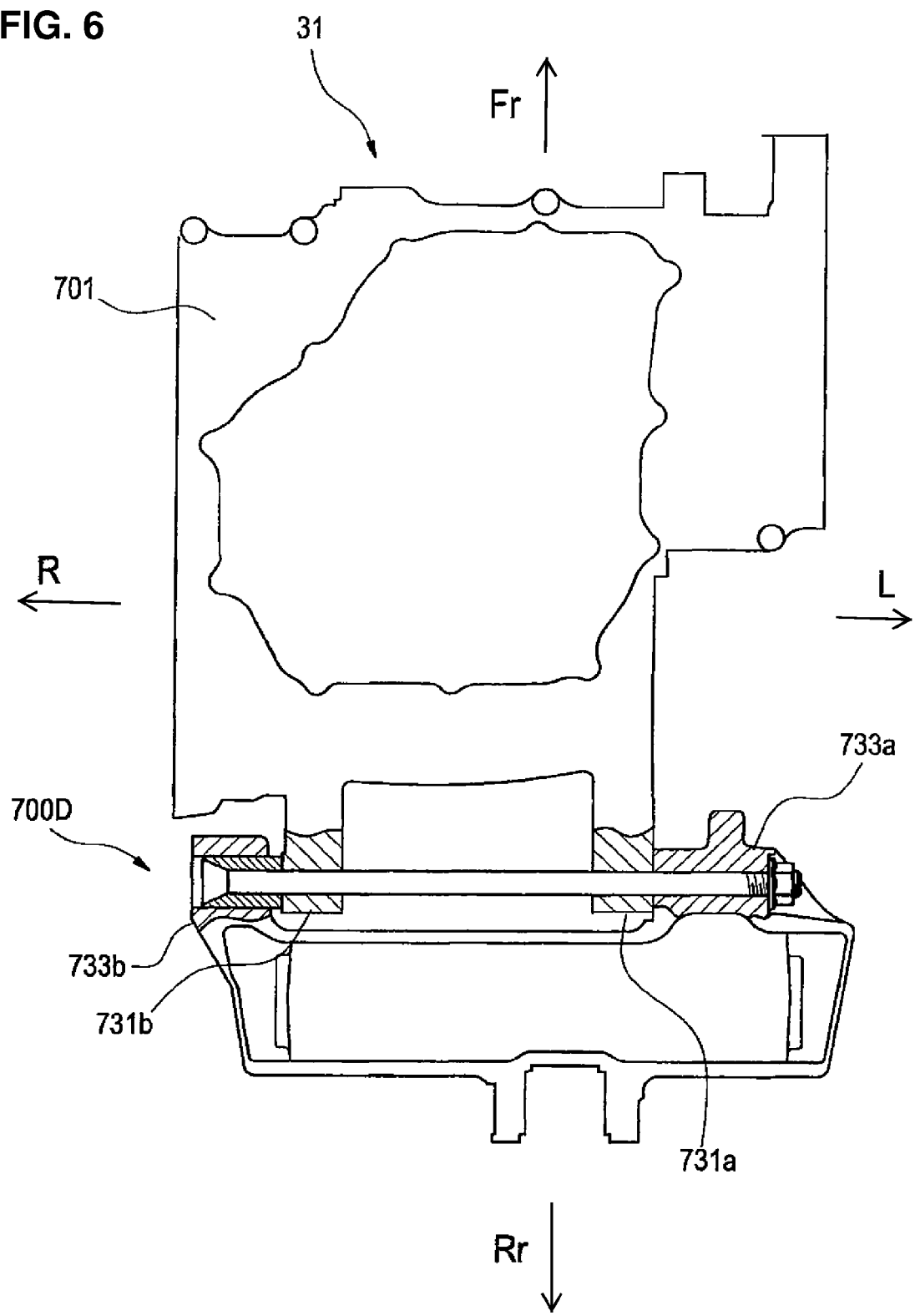
FIG. 6 is a sectional view including a fourth supporting portion of the engine as viewed from the lower face side.
Figure 7:
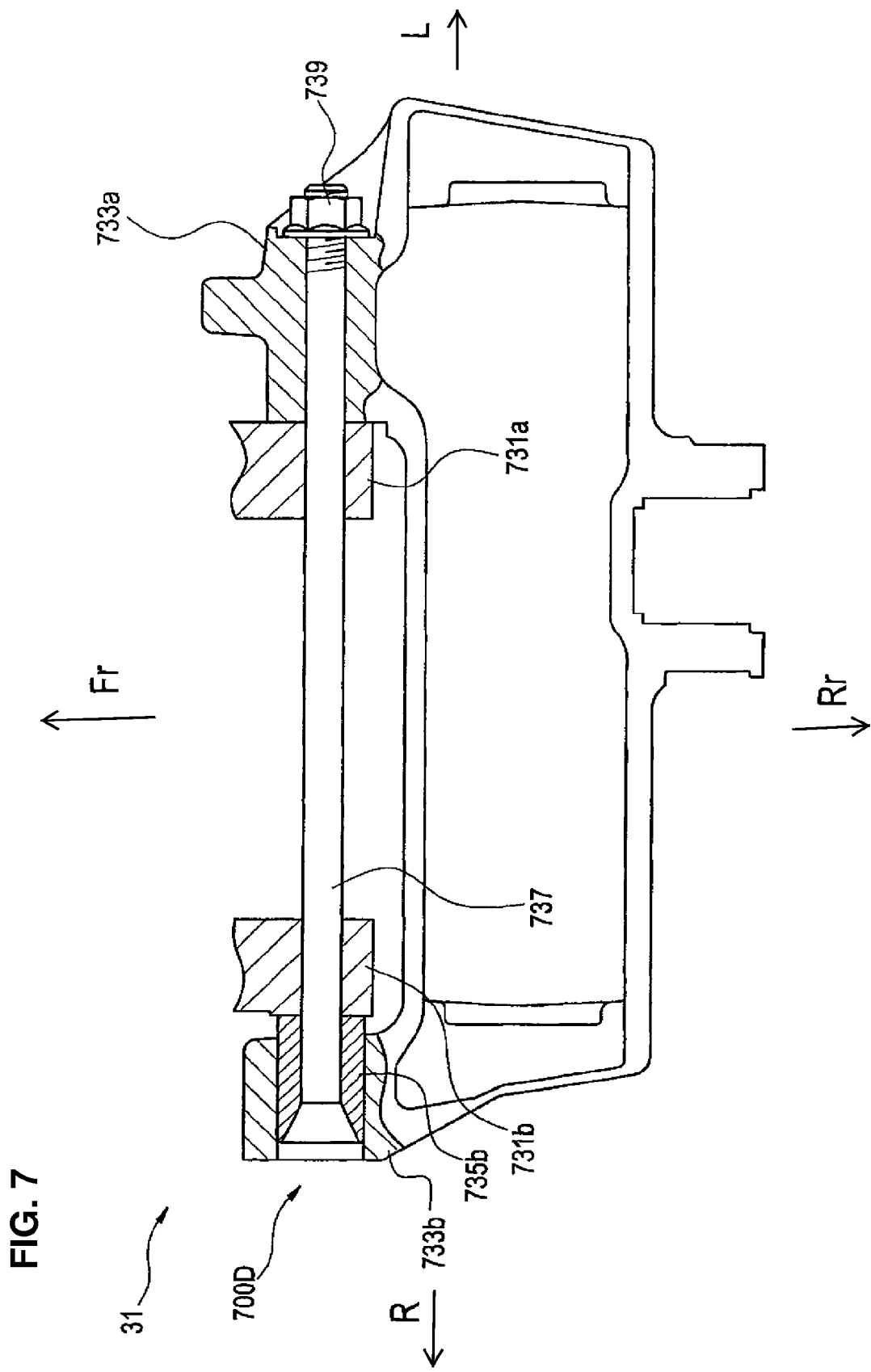
FIG. 7 is an enlarged view of a portion of FIG. 6.

FIG. 3 is a sectional view showing the first supporting portion and the second supporting portion for the engine, FIG. 4 is a sectional view including the third supporting portion of the engine, FIG. 5 is an enlarged view of a portion of FIG. 4, FIG. 6 is a sectional view including the fourth supporting portion of the engine as viewed from the lower face side, and FIG. 7 is an enlarged view of a portion of FIG. 6.

As shown in FIG. 3, the first supporting portion 700A includes left and right engine-supporting portions 707a and 707b provided on the vehicle body frame 11, left and right engine side female threaded portions 703a and 703b provided on the engine 31, a first collar 705a interposed between the engine-supporting portion 707a and the engine side female threaded portion 703a and a second collar 705b interposed between the engine-supporting portion 707b and the engine side female threaded portion 703b, and bolts 709a and 709b for fastening the left and right engine-supporting portions 707a and 707b, collars 705a and 705b and left and right engine side female threaded portions 703a and 703b.

Meanwhile, the second supporting portion 700B includes left and right engine-supporting portions 715a and 715b, left and right engine side female threaded portions 711a and 711b provided on the engine 31, collars 713a and 713b interposed between the engine-supporting portions 715a and 715b and the engine side female threaded portions 711a and 711b, and bolts 717a and 717b for fastening the left and right engine-supporting portions 715a and 715b, collars 713a and 713b and left and right engine side female threaded portions 711a and 711b. Here, for the collar 713b, a collar with an expanding slot is used.

As shown in FIG. 4, the third supporting portion 700C includes left and right engine-supporting portions 725a and 725b disposed at a rear portion of the engine 31 and left and right engine side through-hole portions 721a and 721b fastened to the left and right engine-supporting portions 725a and 725b. In particular, as shown in FIG. 5, collars 723a and 723b are interposed between the left and right engine-supporting portions 725a and 725b and the left and right engine side through-hole portions 721a and 721b provided on the engine 31 and between the engine-supporting portions 725a and 725b and the engine side through-hole portions 721a and 721b.

The left and right engine-supporting portions 725a and 725b, collars 723a and 723b and engine side through-hole portions 721a and 721b are fastened by a through bolt 727 and a nut 729. Here, for the collar 723b, a collar with an expanding slit is used.

As shown in FIG. 6, the fourth supporting portion 700D includes left and right engine-supporting portions 733a and 733b disposed at a rear portion of the engine 31 and left and right engine side through-hole portions 731a and 731b fastened to the left and right engine-supporting portions 733a and 733b. In particular, as shown in FIG. 7, the fourth supporting portion 700D includes the left and right engine-supporting portions 733a and 733b, the left and right engine side through-hole portions 731a and 731b provided on the engine 31, a collar 735b interposed between the engine-supporting portion 733b and the engine side through-hole portion 731b, and a through bolt 737 and a nut 739 by which the engine-supporting portions 733a and 733b, collar 735b and engine side through-hole portions 731a and 731b are fastened.

In the motorcycle of the rigid mount type, where an engine and a vehicle body frame are fastened to each other with a collar interposed therebetween, the collar has a clearance of approximately 0.3 mm from a fastening bolt. Therefore, the collar is relatively displaceable by a very small amount with respect to the bolt. The relative displacement between the collar and the bolt is suppressed by friction between a frame side seating face and an engine side seating face which are acted upon by axial force of the fastening. In a motorcycle of the rigid mount type, the seating face contact is assured to suppress vibrations at the engine fastening sections in directions other than a set direction of the engine to carry out setting of the driving feeling and the controllability.

If the engine 31 vibrates by a very small amount except preset vibration with respect to the vehicle body frame 11 at the fastening sections between the engine 31 and the vehicle body frame 11, then the traveling behavior of the motorcycle 1 varies from the set behavior. Vibrations in directions other than the supposed direction at the fastening sections between the engine 31 and the vehicle body frame 11 which give rise to such a variation of the traveling behavior, as described above, can be prevented if the fastening of the engine 31 is carried out in accordance with the present invention.

Figure 8A:
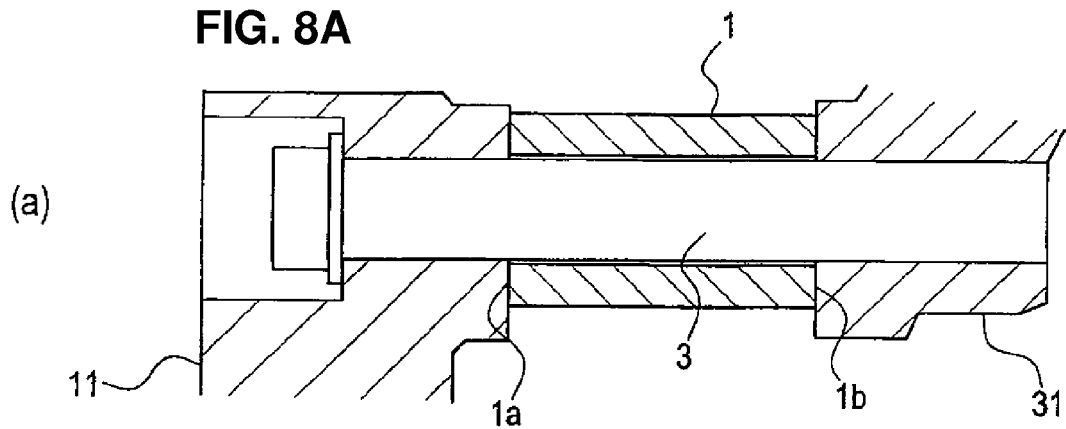
FIG. 8A is a first comparative view illustrating a shearing deformation situation of a supporting structure.
Figure 8B:
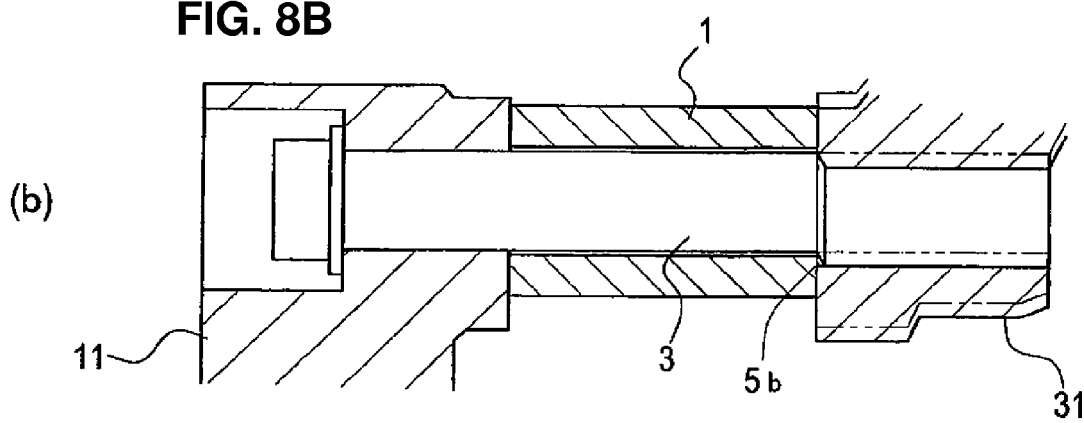
FIG. 8B is a second comparative view illustrating a shearing deformation situation of a supporting structure.
Figure 8C:
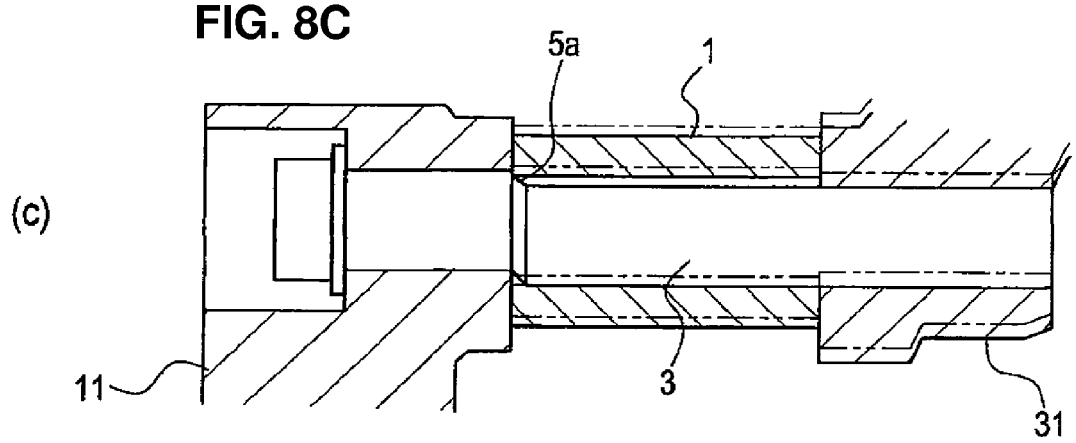
FIG. 8C is a third comparative view illustrating a shearing deformation situation of a supporting structure.

FIGS. 8A, 8B and 8C are conceptive views illustrating a shearing deformation situation of a supporting structure. FIGS. 9A and 9B are conceptive views illustrating a plastic deformation situation of the supporting structure in shown in FIG. 8A and FIG. 8B. It may be noted that, in the conceptive views described below, the deformation amount and the distortion amount are illustrated in an exaggerated manner.

Here, where the motorcycle 1 on which the engine 31 having a large cylinder capacity travels on a road having a large gap or the like and the vehicle undergoes great upward and downward vibrations, the fastening by friction of seating faces 1a and 1b at the opposite ends of the collar shown in FIG. 8A is canceled momentarily and the vehicle body frame 11, collar 1 and engine 31 make relative displacement as seen in FIGS. 8B and 8C. Consequently, a fastening bolt 3 is acted up by shearing deformation and sometimes undergoes very small plastic deformation.

As shown in FIG. 8B, if the engine 31 vibrates by a great amount in a state wherein the collar 1 is fixed to the engine 31, then the fastening bolt 3 undergoes shearing deformation at the contact face between the collar 1 and the vehicle body frame 11. Then, if plastic deformation occurs, then permanent strain 5a or 5b remains in the fastening bolt 3.

If such permanent strain 5a or 5b remains in the fastening bolt 3, then the seating face contact between the collar 1 and the engine 31 or between the collar 1 and the vehicle body frame 11 sometimes varies such that the contact occurs at part of the seating face as shown in FIGS. 9A and 9B. If the seating face contact varies in this manner, then vibrations or the steering performance may vary. In such an instance, the fastening structure is set appropriately in accordance with the vehicle.

In the conventional structure, wherein a wedge-like projection is provided on the opposite end seating faces of the collar 1 in an engine supporting structure for a motorcycle wherein the collar 1 is interposed between the vehicle body frame 11 and the engine 31. In such structure, the relative displacement between the collar 1 and the bolt 3 can be suppressed to the utmost. However, the cost required for the working is high. Further, positioning of the collar 1 in the circumferential direction is required, and time and labor are required for the working.

Figure 10A:
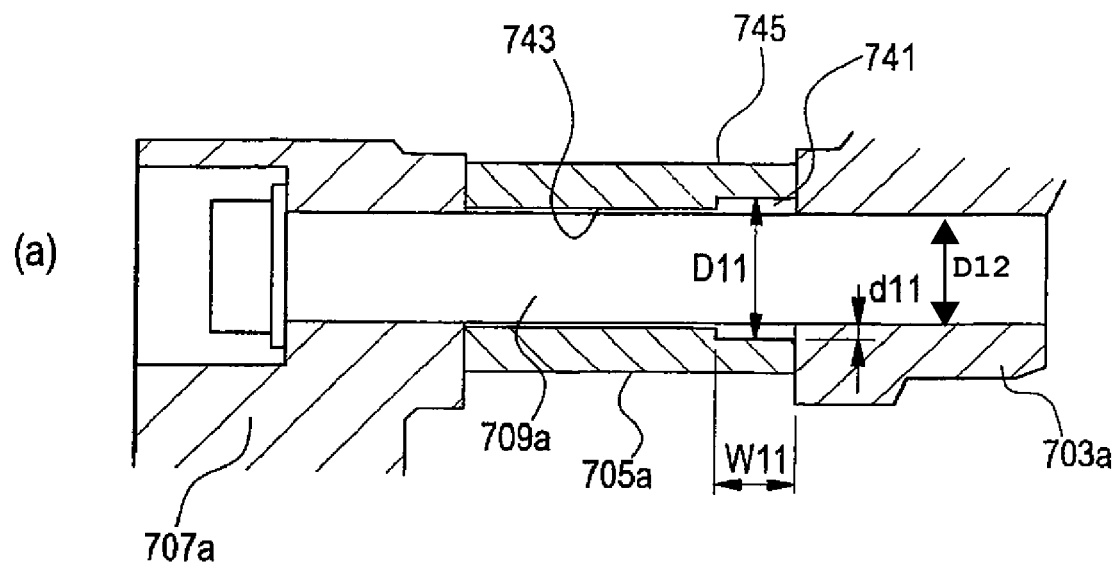
FIG. 10A is a first conceptive view illustrating a supporting situation of a stepped collar supporting structure according to an embodiment.
Figure 10B:
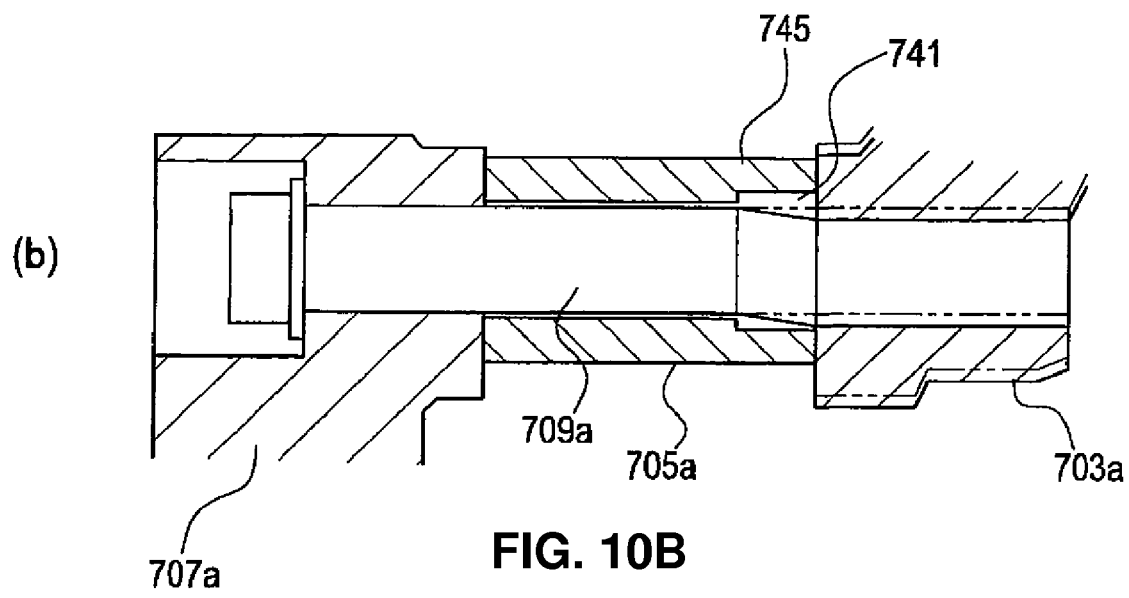
FIG. 10B is a second conceptive view illustrating a supporting situation of a stepped collar supporting structure according to another embodiment.

FIGS. 10A and 10B are conceptive views illustrating a supporting situation of a stepped collar supporting structure according to the embodiment of the present invention.

In the engine-fastening structure of the motorcycle 1 according to the present invention, for example, in the first supporting portion 700A, between the collar 705a and the bolt 709a at least at a location opposing to the boundary between the collar 705a and the engine-supporting portion 707a or the boundary between the collar 705a and the engine side female threaded portion 703a, a gap 741 which is greater than that at any other location is provided as shown in FIG. 10A. Accordingly, concentration of shearing stress which acts upon the bolt 709a along a cross section which includes a collar end face 743 is moderated since the shearing stress is dispersed in the range in which the gap 741 is formed. In particular, even if the engine 31 vibrates by a great amount in a state wherein the collar 705a is fixed to the engine side female threaded portion 703a, great shearing deformation is prevented. Therefore, no plastic deformation appears and the seating face contact is maintained.

In the collar 705a, a portion of an inner diameter D11 of at least one of an engine side end portion and a frame side end portion of a fitting hole 743 is formed as a large diameter portion, and any other portion of the fitting hole 743 is formed as a small diameter portion D12 having a diameter smaller than that of the large diameter portion D11. Consequently, positioning is carried out with the end face of the small diameter portion D12 which has a large contact area, and concentration of the shearing stress is moderated on the end face side of the large diameter portion D11 which has a small contact area.

The large diameter portion D11 has a width W11 of 5 mm or more, and the diameter difference d11 between the large diameter portion D11 and the bolt 709a is equal to or greater than 1 mm. Particularly where the engine 31 has high weight, concentration of the shearing stress which appears where the width W (range) of the large diameter portion D11 is 5 mm or less and the diameter difference is 1 mm or less can be prevented.

It may be noted that a mark-off line 745 which is a mark portion is provided on a cylindrical face of a portion of the collar 705a on the large diameter portion D11 side. This facilitates decision between the large diameter portion D11 side and the small diameter portion D12 side of the collar 705a.

The mark portion according to the present invention includes also a projection, a hollow and so forth.

Figure 11A:
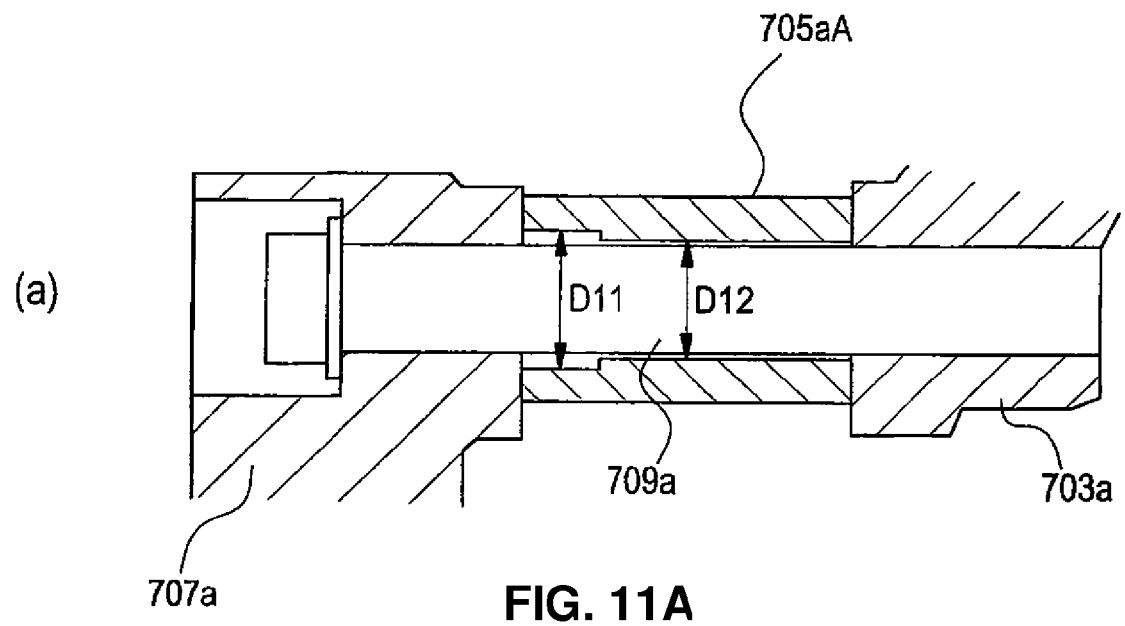
FIG. 11A is conceptive view illustrating modifications to a stepped collar of the embodiment shown in FIG. 8A.
Figure 11B:
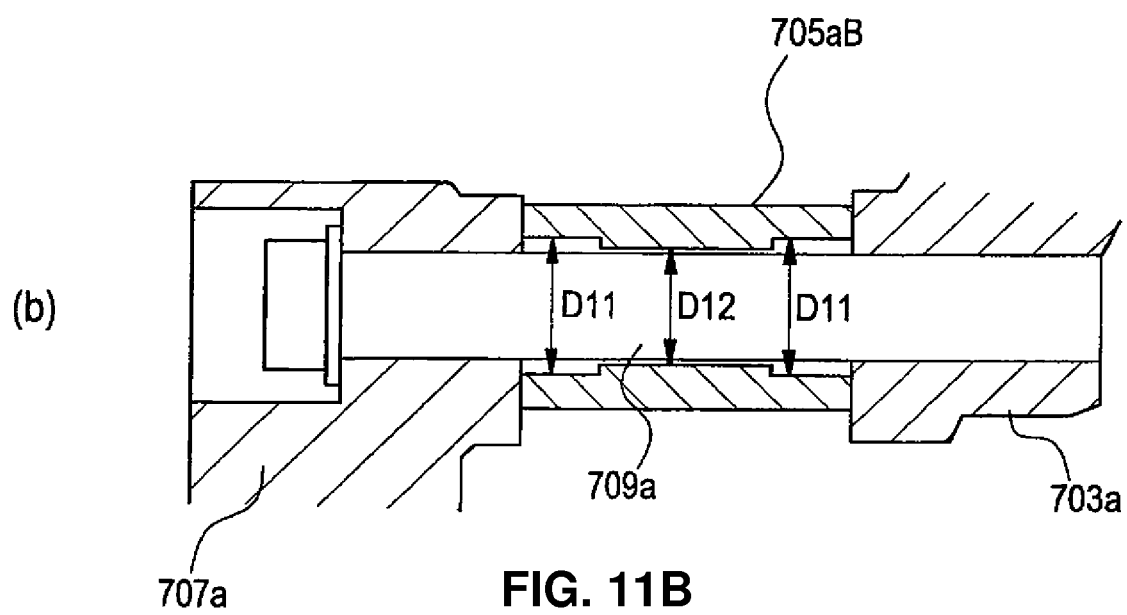
FIG. 11B is conceptive view illustrating modifications to a stepped collar of the embodiment shown in FIG. 8B.

FIGS. 11A and 11B are conceptive views illustrating modifications to the stepped collar.

As shown in FIG. 11A, the large diameter portion D11 may be formed on an end side of a collar 750aA which opposes to the boundary between the collar 750aA and the engine-supporting portion 707a. Further, the large diameter portion D11 may otherwise be formed on the opposite sides of the collar 750aA which oppose to the boundary between the collar 750aA and the engine-supporting portion 707a and the boundary between the collar 750aA and the engine side female threaded portion 703a as shown in FIG. 11B.

While, in the example described above, the large diameter portion D11 is formed on the collar 705a to form the gap 741, the gap 741 may otherwise be provided by varying the outer diameter of the bolt 709.

Figure 12A:
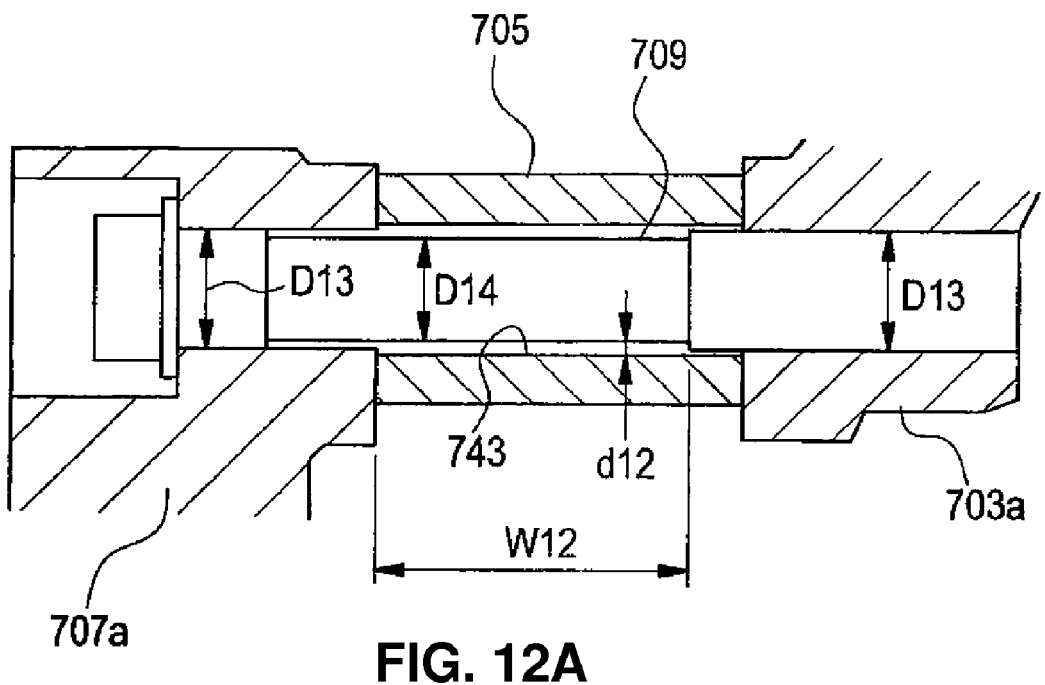
FIG. 12A is conceptive view illustrating a supporting situation of a stepped bolt supporting structure according to an embodiment.
Figure 12B:
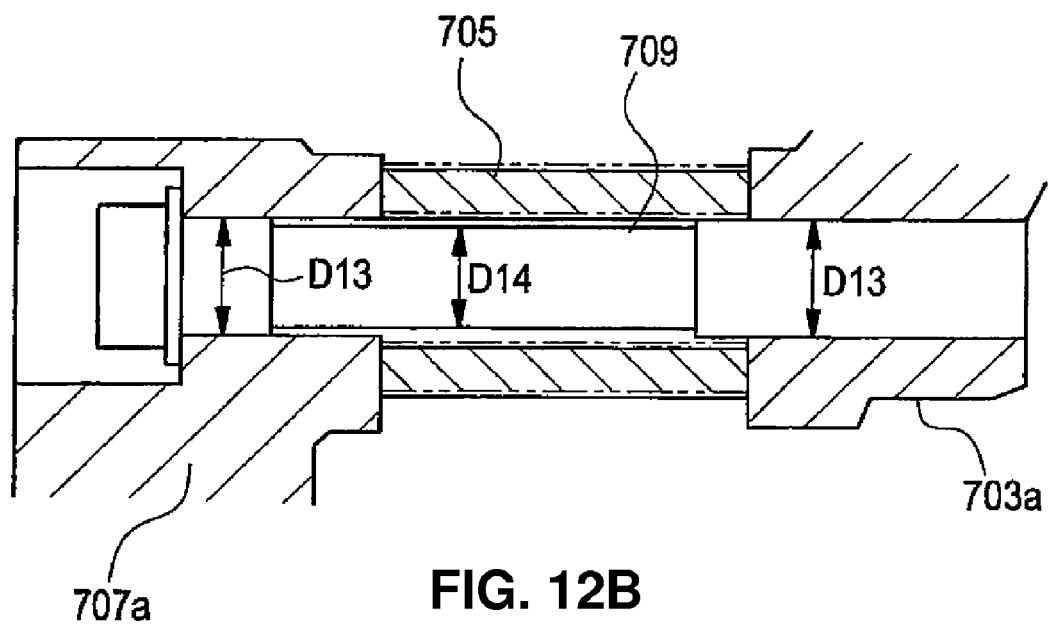
FIG. 12B is conceptive view illustrating a supporting situation of a stepped bolt supporting structure according to another embodiment.
Figure 13A:
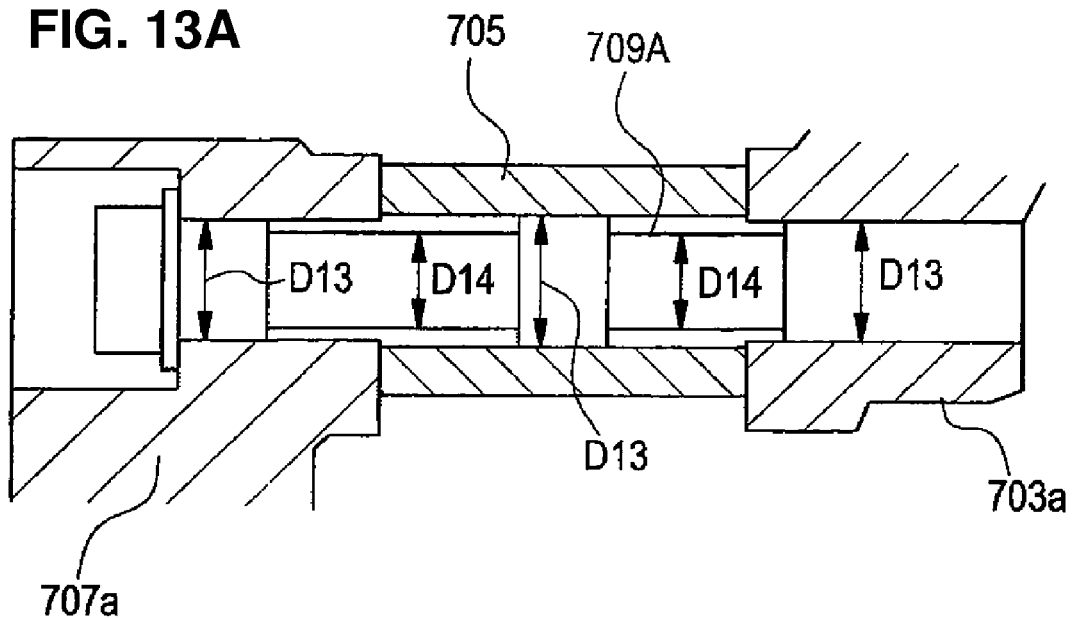
FIG. 13A is conceptive view illustrating modifications to a stepped bolt according to an embodiment.
Figure 13B:
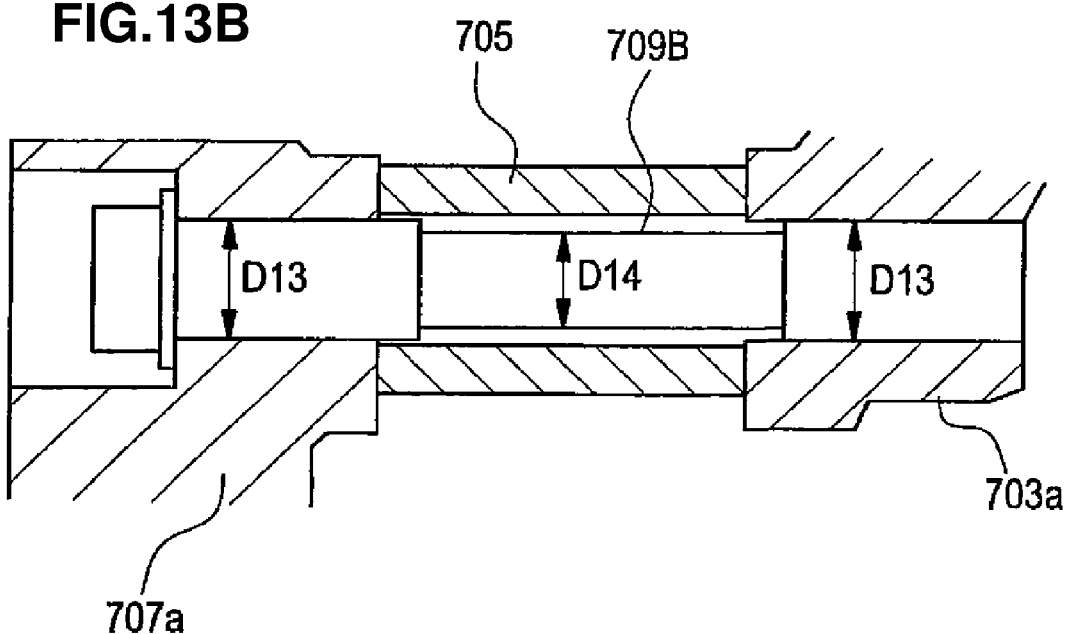
FIG. 13B is conceptive view illustrating modifications to a stepped bolt according to another embodiment.

FIGS. 12A and 12B are conceptive views illustrating a supporting situation of a stepped bolt supporting structure. FIGS. 13A and 13B are conceptive views illustrating modifications to the stepped bolt.

As shown in FIGS. 12A and 12B, one of a portion of a bolt 709 in a range from an engine side end portion of a collar 705 to the engine side female threaded portion 703a, another portion of the bolt 709 in another range from the engine-supporting portion 707a to a frame side end portion of the collar 705 and a further portion of the bolt 709 in a range of an intermediate portion of the collar is formed as a large diameter portion D13.

At a position where the portion of the bolt 709 in the range from the engine side end portion of the collar 705 to the engine side female threaded portion 703a is formed as the large diameter portion D13, also an end portion of the engine-supporting portion 707a outside the frame is formed as the large diameter portion D13 FIG. 13B. At a position where the portion of the bolt 709 in the range from the engine-supporting portion to the frame side end portion of the collar 705 is formed as the large diameter portion D13, also an inner side end portion of the engine side female threaded portion is formed as the large diameter portion D13.

Where the portion of the bolt 709A in the range of the intermediate portion of the collar 705 is formed as the large diameter portion D13 (FIG. 13A), an end portion of the engine-supporting portion outside the frame and an inner side end portion of the engine side female threaded portion 703a are formed as the large diameter portion D13. Meanwhile, any other portion of the bolt 709 than those mentioned above is formed as a small diameter portion D14 having a diameter smaller than that of the large diameter portion D13.

Also in this configuration, even if the engine 31 vibrates by a great amount in a state wherein the collar 705 is fixed to the engine 31, as shown in FIG. 12B, the small diameter portion D14, the collar 705 does not contact with the bolt 709 on the contact plane between the collar 705 and the engine-supporting portion 707a. In particular, positioning is carried out by the large diameter portion D13 and the collar 705 while concentration of shearing stress is moderated between the small diameter portion D14 and the collar 705.

In other words, great shearing deformation on the contact plane between the collar 705 and the engine-supporting portion 707a can be prevented. Consequently, plastic deformation does not occur either, and the seating face contact is maintained.

The small diameter portion D14 of the bolt 709 has a width W12 of 5 mm or more in the collar at least from the collar end portion, and the inner diameter difference d12 between the small diameter portion D14 of the bolt 709 and the collar fitting hole 743 is 1 mm or more. Particularly, in the engine-fastening structure of the motorcycle 1 where it has a great cylinder capacity, concentration of the shearing stress which occurs where the width (range) of the small diameter portion D14 is 5 mm or less and the diameter difference between the small diameter portion D14 and the collar 705 is 1 mm or less is avoided, and an optimum bolt shape by which shearing deformation is suppressed is obtained.

As described above, with the motorcycle of the present embodiment, where the frame 11, collar 705 and engine 31 tend to make relative displacement, positioning of the collar 705a and the bolt 709a is carried out at the contact location therebetween, and the side on which relative displacement between the collar 705a and the frame 11 or between the collar 705a and the engine 31 occurs can be controlled. Consequently, shearing deformation of the bolt 709a can be suppressed to the utmost. As a result, plastic deformation of the bolt 709a becomes less likely to occur, and the seating face contact at the opposite ends of the collar can be stabilized.

Further, with the motorcycle of the present embodiment, since the fitting hole 743 of the collar 705a has a step formed thereon, where the frame 11, collar 705a and engine 31 tend to make relative displacement, positioning is carried out by the small diameter portion D12 and the bolt 709a. Further, since the area of the end face on the large diameter portion D11 side is small, relative displacement occurs on the seating face on the large diameter portion D11 side.

In other words, the side on which relative displacement occurs between the collar 705a and the frame 11 or between the collar 705a and the engine 31 can be controlled. Since the bolt 709a on the large diameter portion D11 side is less likely to contact with the collar 705a, shearing deformation of the bolt 709a can be suppressed to the utmost. As a result, plastic deformation becomes less likely to occur with the bolt 709a, and the seating face contact at the opposite ends of the collar can be stabilized.

Further, in the motorcycle of the present embodiment, particularly in an engine-fastening structure for a saddle-type vehicle of a large cylinder capacity, an optimum shape which suppresses shearing deformation of the bolt 709a can be achieved.

Further, with the motorcycle of the present embodiment, the large diameter portion D11 side of the collar 705a is visually observed, and working upon fastening is facilitated.

Further, according to the motorcycle of the present embodiment, since the bolt 709 has a step formed thereon, where the frame 11, collar 705 and engine 31 tend to make relative displacement, since positioning is carried out by the large diameter portion D13 and the collar 705, relative displacement occurs on the seating face on the small diameter portion D14 side.

Accordingly, the side on which relative displacement occurs between the collar 705 and the frame 11 or between the collar 705 and the engine 31 can be controlled. Besides, since the bolt 709 on the small diameter portion D14 side is less likely to contact with the collar 705, shearing deformation of the bolt 709 can be suppressed to the utmost. As a result, shearing deformation becomes less likely to occur with the bolt 709, and the seating face contact at the opposite ends of the collar can be stabilized.

Further, in the motorcycle of the present embodiment, particularly in an engine-fastening structure for a saddle-type vehicle of a large cylinder capacity, an optimum shape which suppresses shearing deformation of the bolt 709 can be achieved.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A saddle-type vehicle, comprising:
   a vehicle body frame having at least one engine-supporting portion provided thereon,
   an engine including an engine block having at least one engine side female threaded portion having an opening formed therein which is alignable with the engine-supporting portion, and
   a collar interposed between said engine-supporting portion and said engine side female threaded portion,
      wherein said engine-supporting portion, collar and engine side female threaded portion are fastened together by a bolt,
      wherein the bolt is spaced a first distance apart from the collar in the diametrical direction,
      and wherein at least one gap is disposed adjacent to one of a boundary between said collar and said engine-supporting portion and another boundary between said collar and said engine side female threaded portion in a diametrical direction which is greater than that of the first distance.

2. The saddle-type vehicle according to claim 1, wherein:
   at least one of an engine side end portion and a frame side end portion of a fitting hole of said collar is formed as a large-diameter portion having a great inner diameter, and
   any other portion of the fitting hole of said collar is formed as a small diameter portion having a smaller diameter than that of the large-diameter portion.

3. The saddle-type vehicle according to claim 2, wherein said collar large-diameter portion has a width equal to or greater than 5 mm, and wherein a diameter difference between the large-diameter portion and said bolt is equal to or greater than 1 mm.

4. The saddle-type vehicle according to claim 3, wherein a mark portion is provided on a cylindrical face of the large-diameter portion side of said collar.

5. The saddle-type vehicle according to claim 1, characterized in that:
   one of a first portion of said bolt in a range from the engine side end portion of said collar to the engine side female threaded portion, a second portion of said bolt in a range from said engine-supporting portion to the frame side end portion of said collar, and a third portion of said bolt in a further range of an intermediate portion of said collar is formed as a large-diameter portion, that
   where the portion of said bolt in the range from the engine side end portion of said collar to the engine side female threaded portion is formed as the large-diameter portion, also an end portion of said bolt in a range of a portion of said engine-supporting portion which is outside of said frame is formed with a diameter substantially equal to the large-diameter portion, that
   where the portion of said bolt in the range from said engine-supporting portion to the frame side end portion of said collar is formed as the large-diameter portion, an end portion of said bolt which is on the inner side of the engine side female threaded portion is formed with a diameter substantially equal to the large-diameter portion, that
   where the portion of said bolt in the range of the intermediate portion of said collar is formed as the large-diameter portion, a portion of said bolt in a range of an end portion of said engine-supporting portion which is outside of said frame and a portion of said bolt in another range of an inner side end portion of said engine side female threaded portion are each respectively formed with a diameter substantially equal to the large-diameter portion, and that
   any other portion of said bolt is formed as a small diameter portion having a diameter smaller than the diameter of the large diameter portion.

6. The saddle-type vehicle according to claim 5, wherein:
   the small diameter portion of said bolt has a width of 5 mm or more in the range of said collar from an end portion of said collar, and
   an inner diameter difference between the small diameter portion of said bolt and said fitting hole of said collar is 1 mm or more.

7. A saddle-type vehicle comprising:
   a vehicle body frame having a pair of left and right engine-supporting portions,
   an engine having a through-hole provided therein,
   a collar interposed between said engine-supporting portion and the through-hole of said engine, and
   a penetrating bolt having a male threaded portion formed at an end portion thereof and extending through said pair of left and right engine-supporting portions, said collar and the through-hole of said engine and a nut for being screwed with the male threaded end portion of said penetrating bolt to fasten said pair of left and right engine-supporting portions, collar and engine, characterized in that
   the bolt is spaced a first distance apart from the collar in the diametrical direction, and at least one gap is disposed adjacent to one of a boundary between said collar and said engine-supporting portion and another boundary between said collar and said through-hole in a diametrical direction which is greater than that of the first distance.

8. The saddle-type vehicle according to claim 7, characterized in that
   at least one of an engine side end portion and a frame side end portion of a fitting hole of said collar is formed as a large-diameter portion having a great inner diameter, and
   any other portion of the fitting hole of said collar is formed as a small diameter portion having a smaller diameter than that of the large-diameter portion.

9. The saddle-type vehicle according to claim 8, characterized in that said collar large-diameter portion has a width equal to or greater than 5 mm, and a diameter difference between the large-diameter portion and said bolt is equal to or greater than 1 mm.

10. The saddle-type vehicle according to claim 9, characterized in that a mark portion is provided on a cylindrical face of the large-diameter portion side of said collar.

11. The saddle-type vehicle according to claim 7, characterized in that:
    one of a first portion of said bolt in a range from the engine side end portion of said collar to the through-hole, a second portion of said bolt in a range from said engine-supporting portion to the frame side end portion of said collar, and a third portion of said bolt in a further range of an intermediate portion of said collar is formed as a large-diameter portion, that
    where the portion of said bolt in the range from the engine side end portion of said collar to the through-hole is formed as the large-diameter portion, an end portion of said bolt in a range of a portion of said engine-supporting portion which is outside of said frame is formed with a diameter substantially equal to the large-diameter portion, that
    where the portion of said bolt in the range from said engine-supporting portion to the frame side end portion of said collar is formed as the large-diameter portion, an end portion of said bolt which is on the inner side of the engine side female threaded portion is formed with a diameter substantially equal to the large-diameter portion, that
    where the portion of said bolt in the range of the intermediate portion of said collar is formed as the large-diameter portion, a portion of said bolt in a range of an end portion of said engine-supporting portion which is outside of said frame and a portion of said bolt in another range of an inner side end portion of said engine side female threaded portion is formed with a diameter substantially equal to the large-diameter portion, and that
    any other portion of said bolt is formed as a small diameter portion having a diameter smaller than the diameter of the large diameter portion.

12. The saddle-type vehicle according to claim 11, wherein:
    the small diameter portion of said bolt has a width of 5 mm or more in the range of said collar from an end portion of said collar, and
    an inner diameter difference between the small diameter portion of said bolt and said fitting hole of said collar is 1 mm or more.

13. In a saddle-type vehicle having a vehicle body frame with a plurality of engine-supporting portions provided thereon, each of said engine-supporting portions having a respective aperture formed therethrough for receiving a bolt, an engine including an engine block having a plurality of engine side female threaded portions, each having an opening formed therein which is alignable with a corresponding aperture of an engine-supporting portion, and a respective collar interposed between selected engine-supporting portions and corresponding engine side female threaded portions,
    wherein said selected engine-supporting portions, collar and corresponding engine side female threaded portions are fastened together by a bolt,
    the improvement comprising
        the bolt is spaced a first distance apart from the collar in the diametrical direction, and
        at least one gap is disposed adjacent to one of a boundary between said collar and said engine-supporting portion and another boundary between said collar and said engine side female threaded portion in a diametrical direction which is greater than that of the first distance.

14. The saddle-type vehicle according to claim 13, wherein:
    at least one of an engine side end portion and a frame side end portion of a fitting hole of said collar is formed as a large-diameter portion having a great inner diameter, and
    any other portion of the fitting hole of said collar is formed as a small diameter portion having a smaller diameter than that of the large-diameter portion.

15. The saddle-type vehicle according to claim 14, wherein said collar large-diameter portion has a width equal to or greater than 5 mm, and wherein a diameter difference between the large-diameter portion and said bolt is equal to or greater than 1 mm.

16. The saddle-type vehicle according to claim 15, wherein a mark portion is provided on a cylindrical face of the large-diameter portion side of said collar.

17. The saddle-type vehicle according to claim 13, characterized in that:
    one of a first portion of said bolt in a range from the engine side end portion of said collar to the engine side female threaded portion, a second portion of said bolt in a range from said engine-supporting portion to the frame side end portion of said collar, and a third portion of said bolt in a further range of an intermediate portion of said collar is formed as a large-diameter portion, that
    where the portion of said bolt in the range from the engine side end portion of said collar to the engine side female threaded portion is formed as the large-diameter portion, also an end portion of said bolt in a range of a portion of said engine-supporting portion which is outside of said frame is formed with a diameter substantially equal to the large-diameter portion, that
    where the portion of said bolt in the range from said engine-supporting portion to the frame side end portion of said collar is formed as the large-diameter portion, an end portion of said bolt which is on the inner side of the engine side female threaded portion is formed with a diameter substantially equal to the large-diameter portion, that
    where the portion of said bolt in the range of the intermediate portion of said collar is formed as the large-diameter portion, a portion of said bolt in a range of an end portion of said engine-supporting portion which is outside of said frame and a portion of said bolt in another range of an inner side end portion of said engine side female threaded portion are each respectively formed with a diameter substantially equal to the large-diameter portion, and that any other portion of said bolt is formed as a small diameter portion having a diameter smaller than the diameter of the large diameter portion.

18. The saddle-type vehicle according to claim 17, wherein:

the small diameter portion of said bolt has a width of 5 mm or more in the range of said collar from an end portion of said collar, and an inner diameter difference between the small diameter portion of said bolt and said fitting hole of said collar is 1 mm or more.

* * * * *